United States Patent
Burke et al.

(10) Patent No.: US 12,249,758 B2
(45) Date of Patent: Mar. 11, 2025

(54) MULTI-PURPOSE ACCESSORY SYSTEM FOR WIRELESS COMMUNICATION DEVICE

(71) Applicant: Harris Global Communications, Inc., Melbourne, FL (US)

(72) Inventors: Peter Burke, Hilton, NY (US); Richard J. Nink, Melbourne, FL (US); Joel Womack, El Paso, TX (US); Malcolm Packer, Hillsborough, NC (US); Thomas Howe, Rochester, NY (US); Aaron Hendershot, Webster, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 343 days.

(21) Appl. No.: 17/703,352

(22) Filed: Mar. 24, 2022

(65) Prior Publication Data

US 2023/0307822 A1 Sep. 28, 2023

(51) Int. Cl.
*H01Q 1/28* (2006.01)
*H01Q 1/48* (2006.01)
*H01Q 9/30* (2006.01)

(52) U.S. Cl.
CPC .............. *H01Q 1/28* (2013.01); *H01Q 1/48* (2013.01); *H01Q 9/30* (2013.01)

(58) Field of Classification Search
CPC ............ H01Q 1/28; H01Q 1/22; H01Q 1/243; H01Q 1/32; H01Q 1/44; H01Q 1/48; H01Q 9/0407; H01Q 9/30; B64U 20/90–96

See application file for complete search history.

(56) References Cited

U.S. PATENT DOCUMENTS

| | | | |
|---|---|---|---|
| 4,095,231 A | 6/1978 | Carter | |
| 6,133,883 A | 10/2000 | Munson et al. | |

(Continued)

FOREIGN PATENT DOCUMENTS

| | | |
|---|---|---|
| AU | 2018331310 B2 | 4/2021 |
| CA | 2579777 C | 7/2016 |

(Continued)

OTHER PUBLICATIONS

Arrow Antennas: "Model GP 52," 4 pages, retrieved from the Internet:, URL:http://www.arrowantennas.com/inst/GP52.pdf (2012).

(Continued)

*Primary Examiner* — Hasan Islam
(74) *Attorney, Agent, or Firm* — Fox Rothschild LLP; Carol E. Thorstad-Forsyth

(57) ABSTRACT

Wireless communication device (WCD) for use in an unmanned aerial vehicle (UAV) includes a multi-purpose WCD accessory. The accessory is comprised of a first plate having opposed first and second major faces. The first major face includes a heat transfer surface configured to contact a body of the WCD interior of the UAV when the WCD is secured to the first major face. A second plate is attached to the second major face in a cantilever configuration and extends exterior of the fuselage in a direction away from the second major surface. The second plate comprises at least a portion of a ground plane for an antenna system utilized by the WCD, and together with the first plate forms a heat sink for the WCD.

11 Claims, 7 Drawing Sheets

(56) References Cited

U.S. PATENT DOCUMENTS

| | | |
|---|---|---|
| 8,111,204 B2 | 2/2012 | Croman |
| 9,412,280 B1 | 8/2016 | Zwillinger et al. |
| 9,738,398 B1 | 8/2017 | Wang et al. |
| 9,975,632 B2* | 5/2018 | Alegria .................. B64U 10/13 |
| 2003/0093187 A1 | 5/2003 | Walker |
| 2004/0008253 A1 | 1/2004 | Monroe |
| 2010/0123042 A1 | 5/2010 | Ballard et al. |
| 2012/0200460 A1 | 8/2012 | Weed et al. |
| 2014/0183300 A1 | 7/2014 | MacCulloch et al. |
| 2017/0257165 A1 | 9/2017 | Pescod et al. |
| 2017/0337813 A1 | 11/2017 | Taylor |
| 2018/0024555 A1 | 1/2018 | Parks et al. |
| 2018/0101169 A1 | 4/2018 | Applewhite |
| 2018/0362190 A1 | 12/2018 | Chambers et al. |
| 2019/0068953 A1 | 2/2019 | Choi et al. |
| 2020/0031437 A1 | 1/2020 | Moses et al. |
| 2020/0031438 A1 | 1/2020 | Moses et al. |
| 2020/0079488 A1* | 3/2020 | Messori ................ B64C 27/001 |
| 2020/0120458 A1 | 4/2020 | Aldana et al. |
| 2020/0225684 A1 | 7/2020 | Anderson et al. |
| 2020/0280827 A1 | 9/2020 | Fechtel et al. |
| 2021/0018630 A1 | 1/2021 | Mueller et al. |
| 2023/0136181 A1 | 5/2023 | Wiegman |

FOREIGN PATENT DOCUMENTS

| | | |
|---|---|---|
| EP | 2526589 B1 | 11/2014 |
| GB | 648015 | 12/1950 |
| JP | S497844 | 1/1974 |
| JP | 2003298270 | 10/2003 |
| WO | 2010036442 A1 | 4/2010 |
| WO | 2011156706 A1 | 12/2011 |

OTHER PUBLICATIONS

"Evidence of availability and properties of GP52 from Arrow Antennas," 2 pages, retrieved from the Internet: URL: http://web.archive.org/ (2012).

Extended European Search Report issued Aug. 7, 2023 in European Patent Application No. 23162449.5 (19 pages).

Li, Xiangyu et al. "Gradient-Based UAV Positioning Algorithm for Throughput Optimization in UAV Relay Networks." ICC 2019 (2019).

K. Ikeda, F. Ono, H. Ochiai and R. Miura, "A Virtual MIMO Relay System with Unmanned Aircraft and Multiple Ground Stations," 2014 IEEE 80th Vehicular Technology Conference (VTC2014-Fall), 2014, pp. 1-5, doi: 10.1109/VTCFall.2014.6965849.

J. Keller, B. Deng, D. Gore and J. Minnix, "Effective Non-Cooperative Surveillance for UAS Situational Awareness," 2020 Integrated Communications Navigation and Surveillance Conference (ICNS), 2020, pp. 2E2-1-2E2-10, doi: 10.1109/ICNS50378.2020.9222908.

* cited by examiner

MULTI-PURPOSE ACCESSORY SYSTEM FOR WIRELESS COMMUNICATION DEVICE

BACKGROUND

Statement of the Technical Field

The technical field of this disclosure concerns small, unmanned vehicles, and more particularly concern methods and systems for providing unmanned aerial vehicles with enhanced communication capabilities.

Description of the Related Art

The related art concerns communication systems for unmanned aerial vehicles (UAVs) including certain types of small unmanned aerial vehicles (SUAVs). In recent years there has been a growing interest in utilization of very small lightweight aerial vehicles to perform a wide variety of tasks. For example, such tasks can involve communications and surveillance functions. Of particular interest are Group 1 SUAV vehicles which are backpackable and often used for intelligence, surveillance, and reconnaissance (ISR). These types of SUAs can utilize manual operator control or may be configured with a preprogrammed route of flight. Conventional missions involving such aircraft frequently involve use of onboard sensors and communications equipment to gather and transmit imagery of an objective area back to a ground control station. As such, conventional payloads can comprise forward looking electro-optical (EO) and infra-red (IR) cameras (which may be mounted on gimbals), IR markers, and laser illuminators. Increasing the communication capability of these small light-weight aircraft can be challenging due to the size, weight, and power (SWaP) limitations which are commonly associated with the vehicles.

SUMMARY

This document concerns a multi-purpose accessory system for a wireless communication device (WCD) that is suited particularly for use in an unmanned aerial vehicle (UAV). According to one aspect, the accessory system is comprised of a first plate having opposed first and second major faces. The first major face includes a heat transfer surface configured to contact a body of a WCD when the WCD is secured to the first major face. A second plate is attached to the second major face in a cantilever configuration and includes a portion which extends in a direction away from the second major face. In some scenarios, the second plate can be removably fixed to the first plate with at least one attachment member. Each of the first and second plates can be substantially planar elements comprised of electrically conductive material.

The second plate includes a first broad face on a first major side and a second broad face on a second major side opposed from the first major side. Further, an antenna ground plane is defined by a plurality of conductive radial rod elements extending from peripheral portions of the second plate. In an embodiment described herein, the second plate is an electrical conductor and comprises a portion of the antenna ground plane. The first and second plate are comprised of a material that is highly conductive of thermal energy. Accordingly, the first and second plate also form a heat sink which is configured to transfer heat away from the WCD when the WCD is mounted to the first plate.

According to one aspect, an antenna radiator is mounted to the second plate, and configured to function cooperatively with the antenna ground plane. The conductive radial rod elements are directly thermally coupled to the second plate whereby the heat sink is further comprised of the conductive radial rod elements. The conductive radial rod elements extend in directions parallel to the first major side. In some scenarios, the conductive radial rod elements can be formed of spring steel wire and may be electrically connected to the second plate.

According to one aspect, a mounting tab is provided on a fixed end of the second plate where the second plate is mounted to the second major face of the first plate. The mounting tab extends transversely to the first broad face to define a rigid mounting base for the second plate. The mounting tab is integrally formed from a portion of the second plate which has been bent to extend in a direction transverse to the first broad face.

According to another embodiment, the solution concerns a wireless communication system, which includes a wireless communication device (WCD), and the multi-purpose WCD accessory described herein. In such a scenario, the first and second plate comprise a heat sink which is configured to transfer heat away from the WCD when the WCD is mounted to the first plate.

According to another aspect, the solution concerns a UAV which includes a wireless communication device (WCD). The WCD is disposed interior of a fuselage of the UAV and a multi-purpose WCD accessory as described herein. In particular, the accessory includes a first plate comprised of opposing first and second major faces. The first major face is a heat transfer surface configured to contact a body of the WCD interior of the UAV when the WCD is secured to the first major face. A second plate is attached to the second major face in a cantilever configuration and includes a portion which extends exterior of the fuselage in a direction away from the second major surface. The second plate includes a first broad face on a first major side and a second broad face on a second major side opposed from the first major side. The second plate comprises at least a portion of a ground plane for an antenna system utilized by the WCD, and together with the first plate forms a heat sink for the WCD. The second plate is oriented on the fuselage to facilitate a cooling air flow in directions aligned parallel to the first and second broad faces when the UAV is in motion.

Embodiments also concern a method for cooling a WCD disposed in a UAV. The method involves thermally coupling a conductive metal plate to a heat sink surface of the WCD. The method also includes cooling the WCD. This is accomplished by arranging the conductive metal plate so that it extends directly from an interior of the fuselage where it is thermally coupled to the WCD, to an exterior of the fuselage where it is exposed to a flow of air resulting from movement of the UAV. According to one aspect, the conductive metal plate is used as at least a portion of a ground plane for an antenna radiating element that is mounted to the conductive metal plate whereby the conductive metal plate serves a dual function. The method can also include using the antenna radiating element to facilitate wireless communications with the WCD. Further, a plurality of conductive radial rod elements thermally coupled to the conductive metal plate are used to enhance both a performance of the ground plane and the cooling of the WCD. The method also involves minimizing aerodynamic drag caused by the conductive metal plate by orienting the conductive metal plate so that the flow of air is parallel to at least one major surface of the plate. A resilient compressible pad is used to perform a dual function of fixing a position of the WCD within the fuselage and absorbing impact energy applied to the conductive metal plate due to interactions of the metal plate with objects in the environment external of the UAV.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
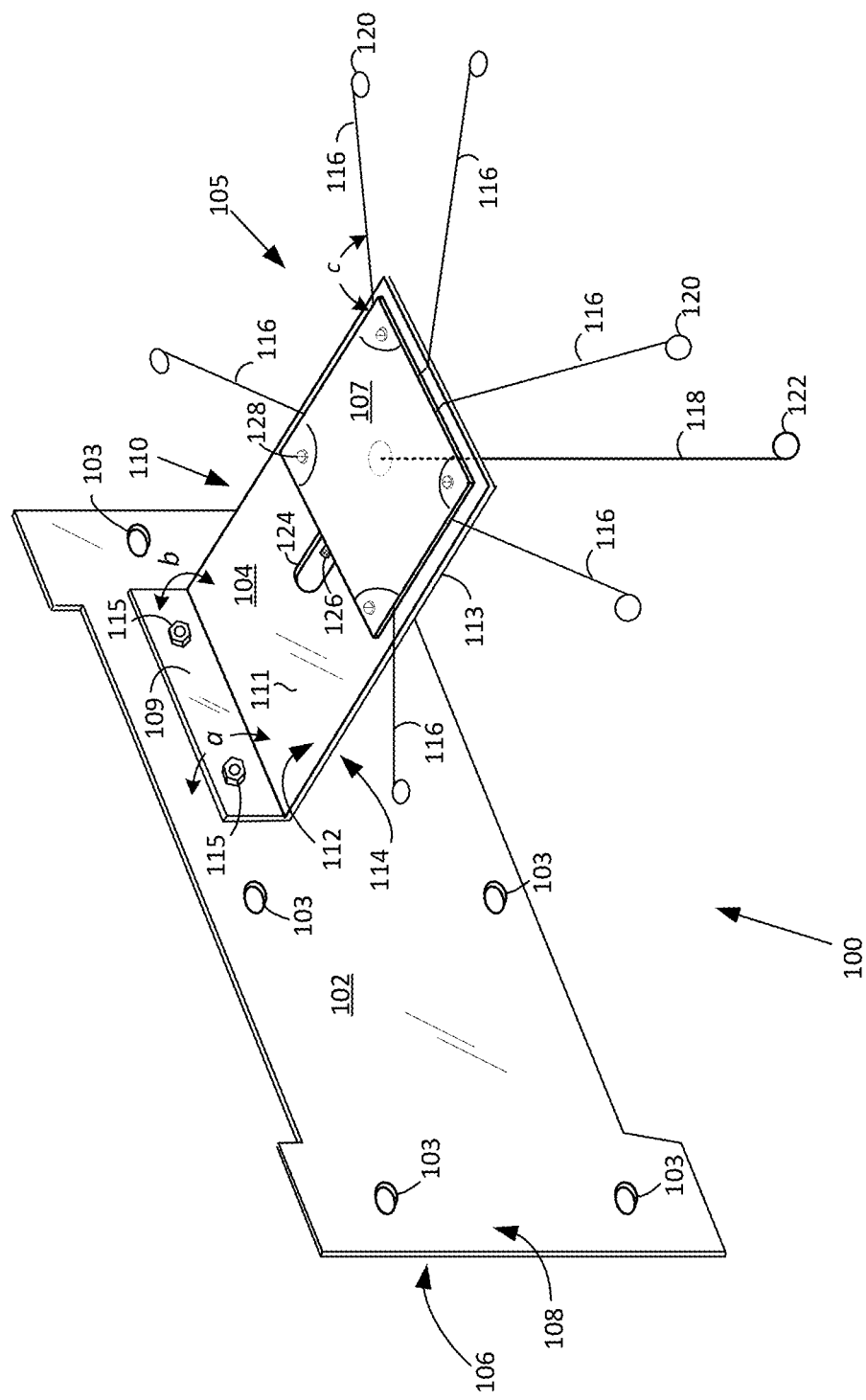
FIG. 1 is a drawing that is useful for understanding an accessory system for a wireless communication device (WCD).

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

Direct VHF and UHF radio communications between ground-based radios is often limited by RF Line of Site (LoS) obstructions which include terrain (such as foliage and mountains), and human made objects (such as buildings). These RF LoS obstructions often limit practical communication distances, which in some instances may be as little as 3 km between dismounted personnel. Newer wideband networking waveforms facilitate repeater-like capabilities which can greatly extend the distances over which dismounted personnel can communicate. For example, such capability can be implemented using an advantaged node which resides in a higher location (as compared to dismounted personnel), and which has relatively unobstructed LOS paths for RF communication with such dismounted personnel. An advantaged node as such will function like a repeater or Communications Relay Payload (CRP). A CRP can be hosted in a UAV to provide the necessary elevation to facilitate the dismounted communication distance between users. However, there are many instances when resources available are limited to Group 1 small UAVs (SUAVs) which have only a very limited maximum take-off weight (e.g., 20 pounds maximum). In such scenarios, size, weight, and power (SWaP) limitations can often prevent a Group 1 SUAVs from hosting a CRP. Further, there is a need for low SWaP solutions to support the growing demand to host CRPs in all types of SUAs.

A typical CRP requires a radio mount, ground plane, heat sink, antenna, and antenna mount. The size and weight impact of each of these items combined pushes the payload above the capacity of Group 1 aircraft. Larger aircraft may have sufficient payload capability to accommodate conventional arrangements which include all of these required ancillary items needed to host a CRP. But any weight associated with these components necessarily limits the flight time and distance of the aircraft. Another challenge in hosting a CRP on an SUAV involves the antenna system. Conventional antenna configurations are often relatively large and too heavy for Group 1 SUA. These antennas are also not optimized for drag reduction and aerodynamic efficiency.

A solution to the foregoing involves a multi-purpose accessory system for a wireless communication device (WCD) such as a CRP. The accessory is comprised of a heat sink that serves multiple functions as a ground plane and mount for both the radio and the antenna. Utilizing the same mount for multiple purposes has significantly reduced overall weight of an installed CRP system in an SUA. The heat sink functions as a cooling device to preventing the WCD from overheating while located in the confined space of the SUAV fuselage. Resilient spring-like conductive metal wires are used to form the antenna radiator and a plurality of radials which help establish an antenna ground plane. The spring-like conductive wires which comprise the ground plane radials ensure optimum antenna performance when utilizing a monopole antenna, while also facilitating the lightest weight possible with the lowest drag coefficient for the small aircraft. The spring-like wire radiating element and ground plane radials facilitate damage-free take off and recovery in situations that involve high rates of acceleration and deceleration. Knurled wire ends decrease the risk of finger, eye pokes and clothing snags.

Figure 2:
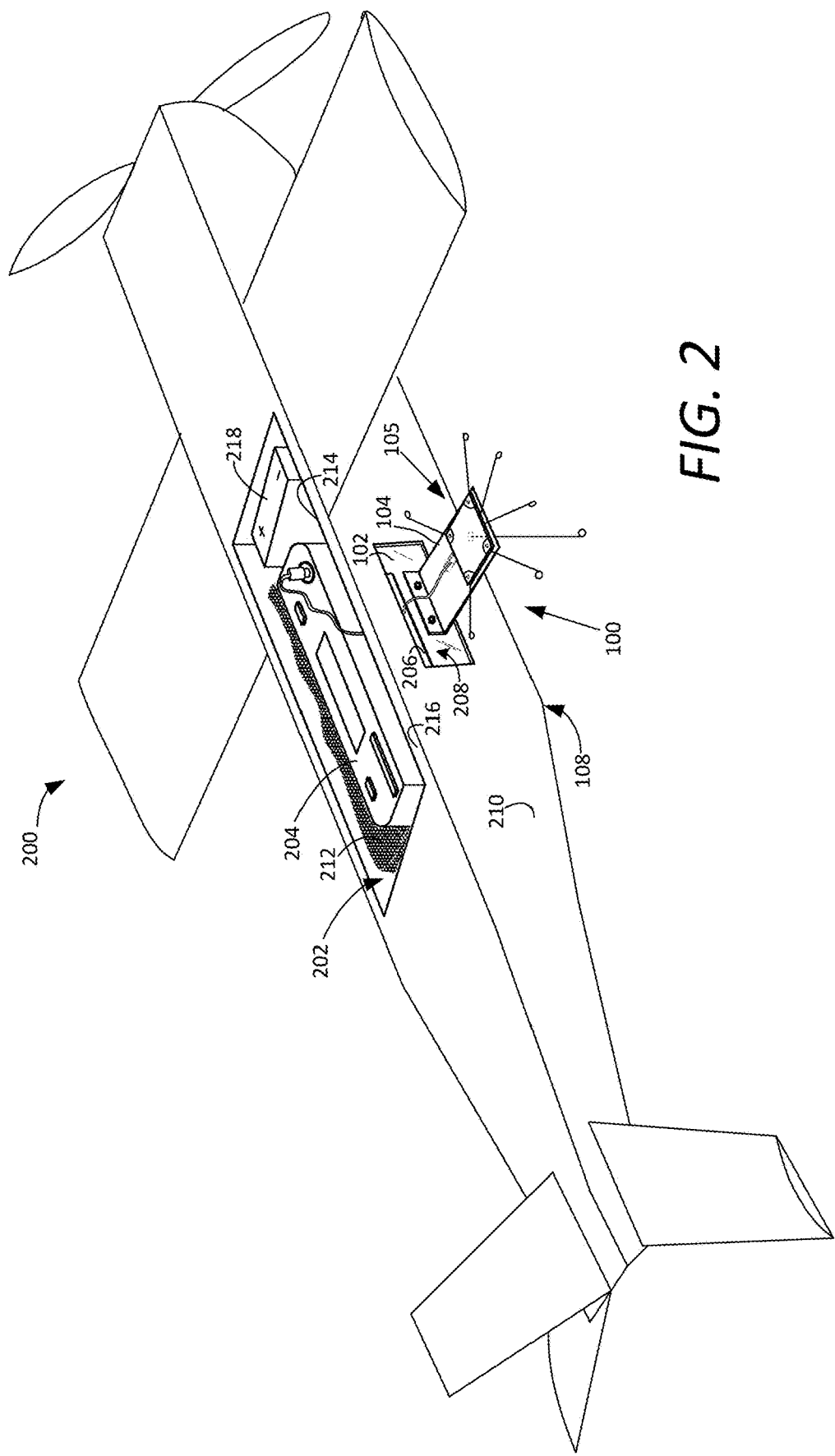
FIG. 2 is a drawing which is useful for understanding how the accessory system can be mounted in an unmanned aerial vehicle (UAV).
Figure 3:
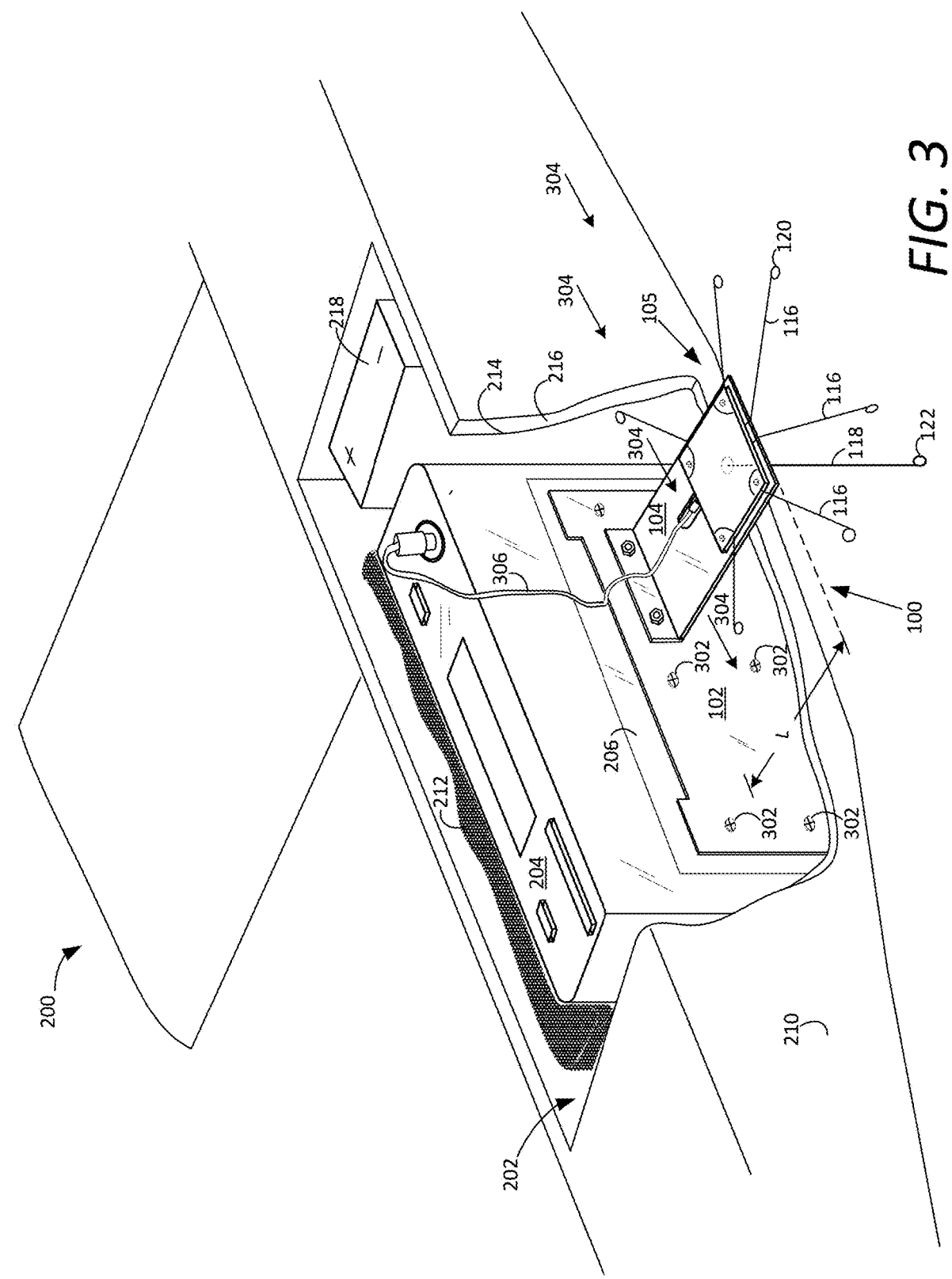
FIG. 3 is a drawing which shows a portion of a fuselage of the UAV cut away which is useful for understanding an arrangement of the accessory system within the UAV.

Referring now to FIGS. 1-3 there are shown several drawings which are useful for understanding an accessory system 100. The multipurpose accessory system 100 is designed to serve several purposes when used with a WCD in an autonomous vehicle, such as a UAV or an SUAV. The various integrated components of the accessory system cooperatively function to concurrently serve as a heat sink, antenna support, and antenna system while adding minimal weight and minimal aerodynamic drag.

The accessory system 100 includes a first plate 102 and a second plate 104. The first plate 102 is comprised of opposing major faces including a first major face 106 and a second major face 108. The first plate 102 can include one or more attachment structures that facilitate attachment of the first plate to a heat sink portion of a WCD as hereinafter described. Examples of such attachment structures can include bores 103 formed in the first plate and configured for receiving threaded screws, bolts, clips, and/or other similar types of attachment devices. The attachment structures can also include lugs, studs, or clips (not shown) which are disposed on the first plate 102 and which are capable of facilitating attachment of the first plate to a heat sink portion of a WCD. In some scenarios, the attachment structure can comprise an adhesive material disposed on first major face 106 which facilitates attachment of the first plate 102 to a WCD. If an adhesive material is used for this purpose, it is preferably an adhesive material that facilitates heat conduction between the WCD and the first plate.

A second plate 104 is attached to the second major face in a cantilever configuration and includes a ground plane portion 110. The ground plane portion 110 extends a predetermined distance L in a direction away from the second major surface 108 to form a platform on which an antenna can be mounted. In some scenarios, the ground plane portion can have an elongated length which extends away from the first plate 102. Further, the ground plane can extend in a direction that is substantially perpendicular and forms an angle α of about 90 degrees with respect to the first plate 102 and/or the second major face 108. Alternative values for the angle α can be appropriate for example to accommodate installation of the accessory system 100 in a particular platform and/or to accommodate different types of antennas.

The second plate 104 can also include a tab portion 109 which in some scenarios may be formed integral with the ground plane portion 110. For example, the second plate can be bent so that the tab portion extends in a direction transverse to the ground plane portion 110. The tab portion can in some scenarios form an angle b of about 90 degrees with respect to the ground plane portion 110. However, the solution is not limited in this regard and in other scenarios it can be desirable for the tab and the ground plane portion to form a different angle. Alternative values for the angle b can be appropriate for example to accommodate installation of the accessory system 100 in a particular platform and/or to accommodate different types of antennas. The tab portion can facilitate a cantilever mounting configuration of the second plate to the first plate. For example, a major surface of the tab 109 can be positioned on the second face 108 to provide a stable mounting based for the second plate on the first plate 102. Securing members 115 can be provided to releasably secure the first plate to the second plate as shown. The securing members can be screws, bolts, clips, or other similar devices which can allow the second plate to be releasably secured to the first plate.

The first and second plate 102, 104 are advantageously comprised of a rigid material that is highly electrically conductive. The material of the first and second plate is advantageously selected so that it is also highly conductive of thermal energy. The use of highly thermally conductive metals is advantageous in a solution described herein as it ensures that the first and second plate are both capable of transferring heat away from the WCD when the WCD is mounted to the first plate. Examples of materials which can be used include various metals such as copper, aluminum, and titanium. However, the solution is not limited in this regard and other materials may also provide suitable results. For example, certain types of composite materials can be made to be highly thermally conductive and electrically conductive. Other alternatives include layered sheets formed of composites, polymers, and/or fiber reinforced plastics which are plated with a material that is highly conductive with respect to electrical and thermal energy.

The ground plane portion 110 has a first broad face 111 on a first major side 112 of the ground plane portion 110 and a second broad face 113 on a second major side 114 opposed from the first major side. An antenna system 105 is disposed on the ground plane portion 110. The antenna system includes a ground plane and at least one radiating element 118. In the example shown in FIGS. 1-3, the radiating element is a monopole comprised of a single elongated conductive wire rod which can be galvanically isolated from the ground plane. Other types of radiating elements are also possible. The ground plane for antenna system 105 is comprised of the ground plane portion 110 and one or more conductive radial rod elements 116 which extend from peripheral portions of the second plate. To facilitate operation of the antenna system 105, the exact value of angles a and b may be adjusted to help ensure that the antenna system has a suitable polarization for a particular communications environment. For example, in some scenarios the angles of a and b can be configured to facilitate vertical polarization during level flight of the SUAV.

The ground plane portion 110 can include an aperture or slot 124. In some scenarios, an antenna port or RF connector 126 which facilitates connection of the antenna system to a WCD can be at least partially recessed within this slot 124. This structure can help protect the RF connector 126 and is useful to facilitate attachment of a connector end of an RF cable 306 which couples the antenna system 105 to a WCD 204. The slot 124 can also facilitate improved access to the antenna port or RF connector 126.

The conductive radial rod elements 116 are advantageously electrically connected to the ground plane portion 110 to facilitate the ground plane function. The exact number of the conductive radial rod elements is not critical. A single radial rod element can be used but improved performance is obtained with more elements. For example, in some scenarios, two, four, six or eight conductive radial rod elements can be used for this purpose. The radial rod elements are advantageously arranged to extend radially around a radiating element 118 but are not necessary in the area between the radiating element 118 and the tab portion 109 where ground plane portion 110 is present. In some scenarios, the conductive radial rod elements 116 can extend in a plane which is substantially parallel to the broad face of the ground plane portion 110. In such scenarios an angle c may be approximately 180°. However, the solution is not limited in this regard and in some scenarios, the conductive radial rod elements can form a different angle with respect to the broad face of the ground plane portion 110. For example, the angle may be between 120° to 180°.

In some scenarios, one or more of the radial rod elements and the elongated conductive wire rod can be formed of a rigid or semi-rigid conductive material such as copper or aluminum. However, in other scenarios it can be advantageous to form these elements from a resilient metal such as spring steel so that the wire rods can spring back to their original shape after temporarily being deformed by impacts with objects in the environment. The system is not limited in this regard and other suitable types of conductive materials can also be used to form the radial rod elements.

In some scenarios, a tip end 120, 122 of the conductive radial rod elements 116 and the radiating element 118 can be modified to help reduce the possibility that they will cause injury to a user and/or catch on objects in an environment around the SUAV. For example, in some scenarios, the tip ends 120, 122 can be curved back upon themselves or looped for this purpose.

Figure 4:
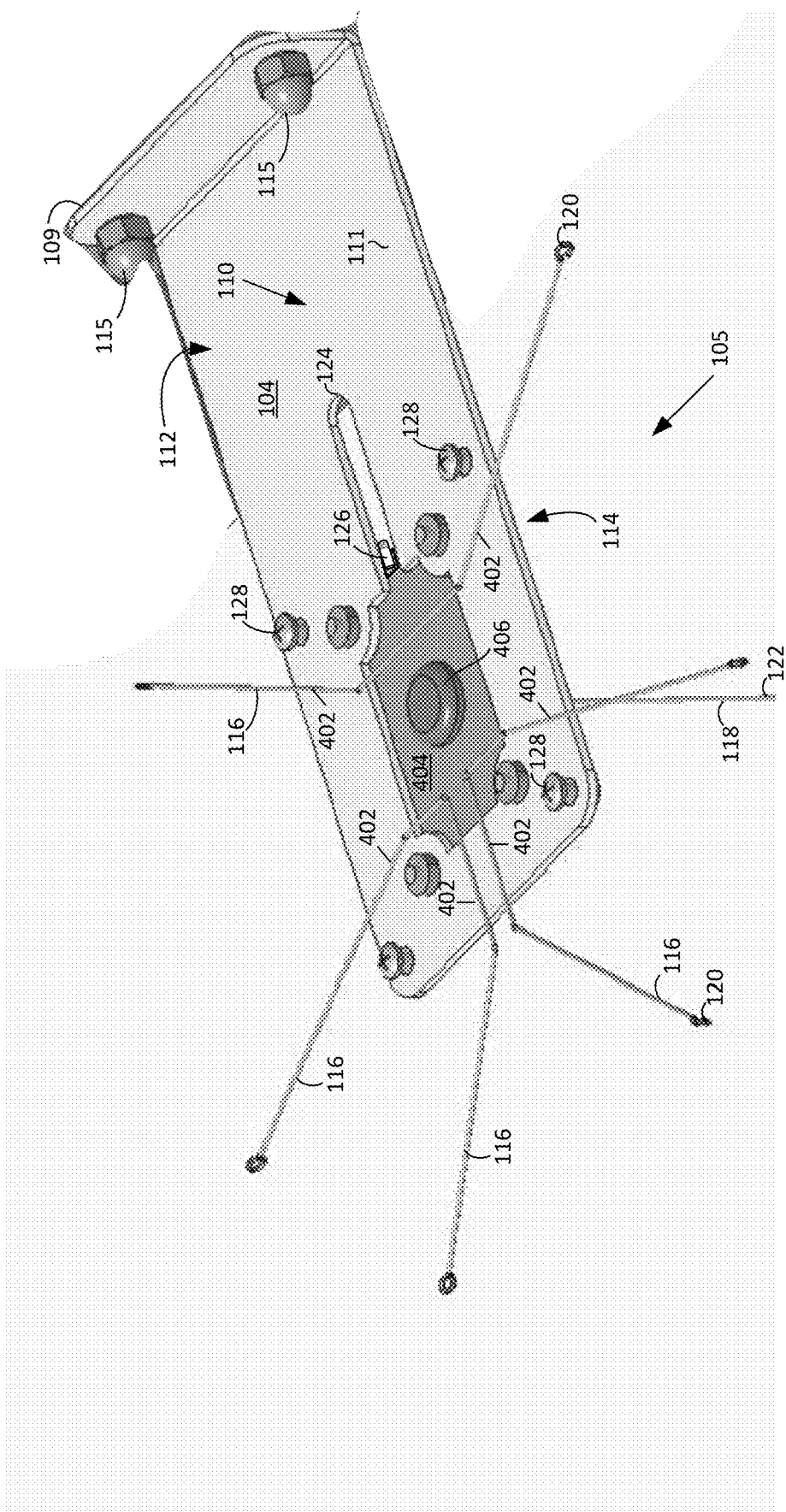
FIG. 4 is a drawing which is useful for understanding a first major side of a ground plane portion of the accessory system.

As best understood with reference to FIG. 4, an engagement portion 402 of the conductive radial rod elements can be secured in position directly on the broad face 111 of the ground plane portion 110. In some scenarios, a pressure plate 107 can be used for this purpose. The pressure plate 107 can be secured to the broad face 111 of the ground plane portion 110 by means of suitable fasteners such as threaded screws 128. The pressure plate can be comprised of a rigid polymer material or a fiber reinforced plastic. In some scenarios, the pressure plate 107 can be comprised of a conductive metal material.

Figure 6:
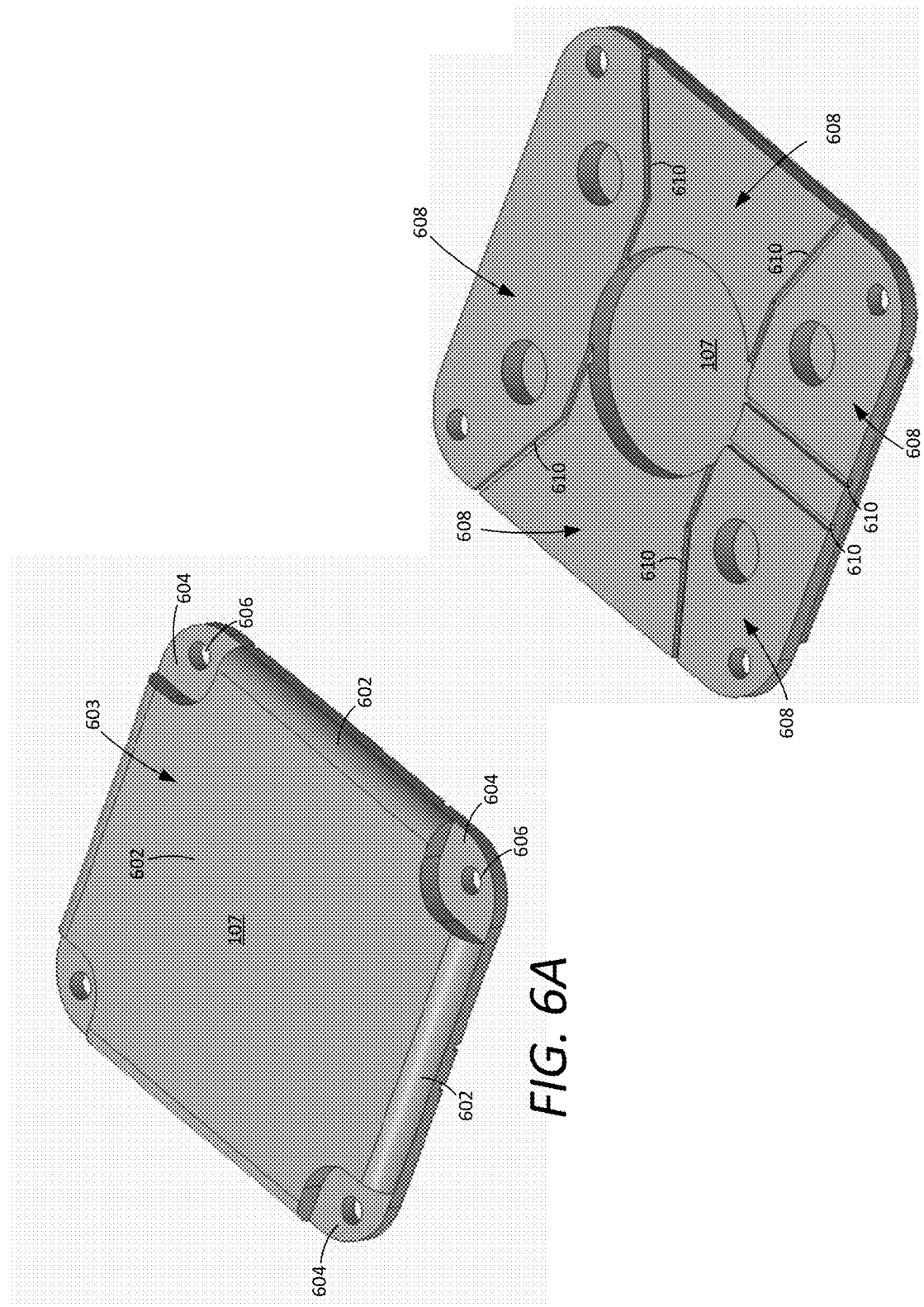
FIGS. 6A and 6B are a series of drawings which are useful for understanding certain features of a pressure plate associated with the accessory system.

Shown in FIGS. 6A and 6B are detailed views of the top and bottom sides of the pressure plate 107. The top side 602 can have one or more smoothly rounded peripheral edges 602 around a periphery of a planar face 603. The planar face and smoothly rounded peripheral edges facilitate a smooth flow of air over the top side of the pressure plate to help reduce aerodynamic drag. The pressure plate can also include recessed portions 604 surrounding one or more bores 606 formed in the pressure plate where threaded screws can be installed 128. The recessed portions 604 are provided to recess head portions of the threaded screws 128 whereby a smooth flow of air can be facilitated over the top side of the pressure plate.

The bottom side of pressure plate 107 can advantageously be formed to include a substantially planar face 608 for engaging the first broad face 111. One or more recessed channels 610 are defined in the planar face 608. The channels are sized and shaped so that an engagement portion 402 of each conductive radial rod elements is advantageously received in one of the recessed channels 610. In this way, the radial rod elements are maintained in a fixed orientation and position on the surface of the first broad face 111 when the pressure plate is secured to the second plate. The depth of each of the channels 610 is advantageously chosen to be less than the diameter or thickness of the conductive radial rod elements. Consequently, the elongated length of each engagement portion 402 can be snugly engaged with the surface of the first broad face 111.

From the foregoing it will be understood that the engagement portions 402 of the one or more radial rod elements are advantageously configured so that, when secured in position by the pressure plate 107, they can each have extensive direct physical contact with the ground plane portion 110 along a major part of their length. This extensive direct physical contact between the engagement portion and the ground plane portion can facilitate heat transfer from the ground plane portion to the conductive radial rod elements. This heat transfer can further assist with removal of heat from the WCD by helping to cool the second plate. From the foregoing it may be understood that the conductive radial rod elements which function firstly as part of the antenna ground plane radial system can have a secondary function which helps the accessory system 100 provide additional cooling for a WCD 204 to which it may be attached.

Figure 5:
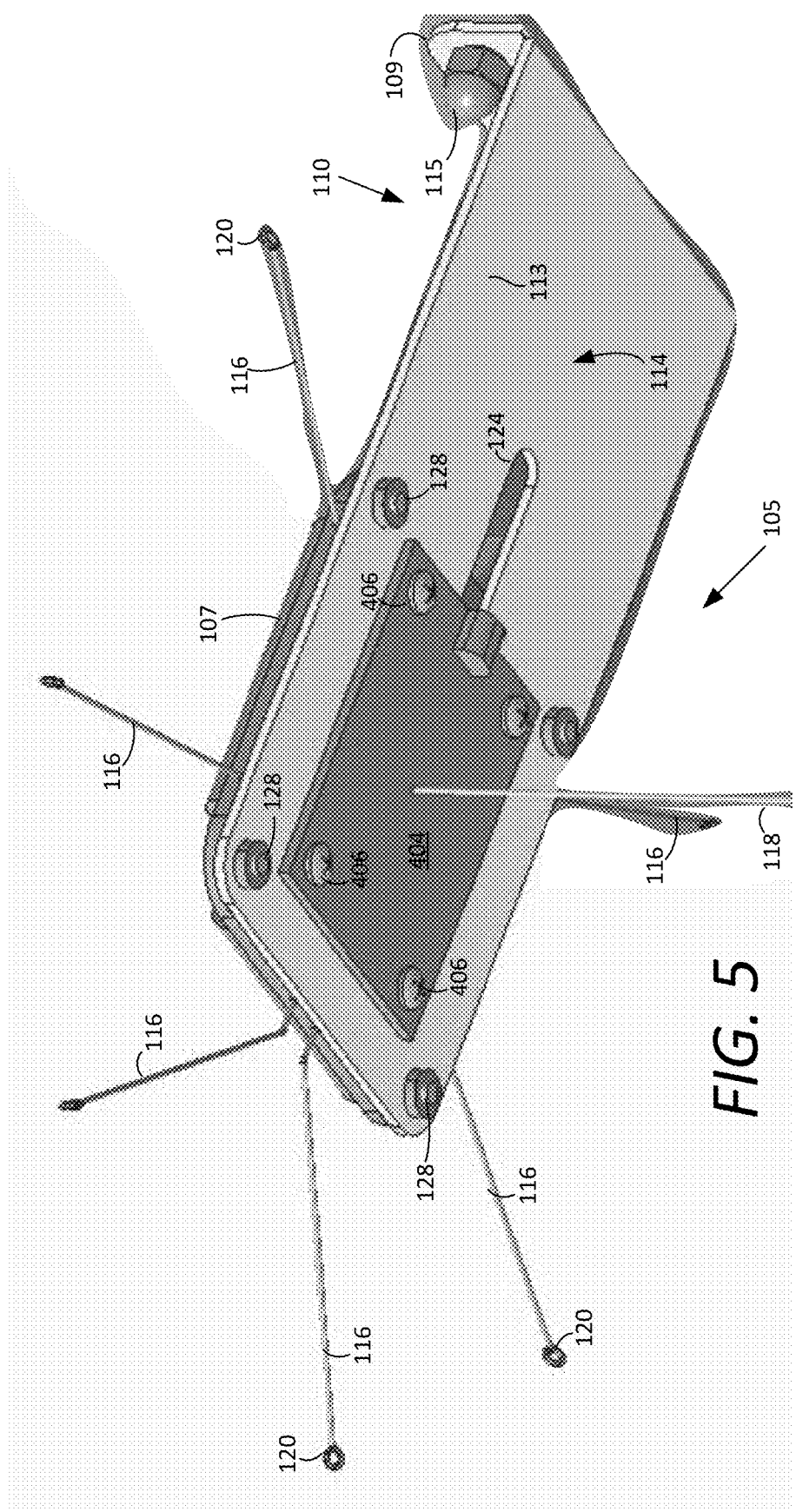
FIG. 5 is a drawing which is useful for understanding a second major side of the ground plane portion of the accessory system.

With reference now to FIGS. 4 and 5, it can be observed that a fixture board 404 is secured to the second broad face 113 of the ground plane portion 110. The fixture board 404 can be secured to the second broad face 113 of the ground plane portion 110 by means of suitable fasteners such as threaded screws 406. In some scenarios, the fixture board 404 can support a base 406 of the antenna radiating element 118. The fixture board 404 can be a printed wiring board (PWB) which includes one or more electronic components (not shown) such as capacitors, inductors and resistors which may help to tune the impedance of the antenna 105. The fixture board 404 can also include an antenna port or RF connector 126 which can mate with a connector end of an RF cable 306. In some scenarios, a feed line (not shown) such as a microstrip feed line may be disposed on the surface of the fixture board to communicate RF energy to and from the radiating element 118.

In FIGS. 2 and 3 the accessory system 100 is shown installed in payload bay 202 of a UAV 202. The system 100 can be installed in many different types of small unmanned vehicles, but the size and weight advantages the system provides make it particularly well suited for use in SUAVs. In the accessory system 100, the first major face 106 is a heat transfer surface which is configured to contact a body of a WCD 204. For example, the first major face can be secured to a heat sink portion 206 of the WCD using the attachment structure 103. In some scenarios, attachment can be facilitated with fasteners 302 which engage the attachment structure 103. The fasteners can be threaded screws, bolts, clips, or the like. In some scenarios, a thermal grease (not shown) can be disposed between the first plate 102 and the heat sink portion 206 to facilitate transfer of thermal energy from the WCD 204 to first plate 102.

Heat transferred to the first plate 102 is efficiently conducted to the second plate 104. As best understood with reference to FIGS. 2 and 3, the accessory system can be positioned with respect to the WCD and the vehicle 200 so that the second plate 104 extends outside the vehicle. This configuration can be facilitated by an aperture 208 formed in the fuselage or body 210 of the vehicle 200. For example, the aperture 208 can be provided adjacent to the payload bay 202. Accordingly, payload bay can have at least one wall with an aperture that allows the second plate 104 to extend outwardly from the first plate 102 to the exterior of the UAV. The releasable attachment configuration of the first plate with respect to the second plate can be advantageous in such scenarios to facilitate installation of the second late 104 where the payload bay and aperture are too small to otherwise accommodate installation of the fully assembled accessory system in the SUAV. With the accessory system secured to the heat sink portion of the WCD 204, thermal energy from the WCD is directly coupled to the first plate 102 and is then conducted to the second plate 104. Heat from the second plate 104 is transferred to the conductive radial rod elements 116.

The accessory system and particularly the second plate is advantageously positioned with respect to the UAV 200 so that an anticipated airflow direction 304 due to the intended motion of the UAV or propwash from the vehicle is parallel to the first and second broad faces 111, 113 of the second plate. This airflow is advantageously transverse to the elongated length of the second plate 104 so that it facilitates cooling of the second plate by flowing over the first and second broad faces in direction 304. Accordingly, the accessory system works cooperatively with the movement and/or propulsion mechanism of the vehicle to facilitate cooling of the WCD 204.

When the accessory system 100 is installed in an UAV 200, the second major face 108 of first plate 102 is secured snugly against an inner face 214 of a wall defining the interior of the payload bay 202. Any suitable mounting structure could be used within the payload bay to facilitate this condition. But size and weight associated with peripheral or accessory elements is advantageously minimized when installing a WCD in a UAV and especially in an SUAV. Accordingly, the necessary force Fr for urging the WCD against the inner face 214 is advantageously provided by a lightweight resilient compressible pad 212. The resilient compressible pad can be made of any suitable material but in some scenarios may be a low density open or closed cell polyurethane foam.

Figure 7:
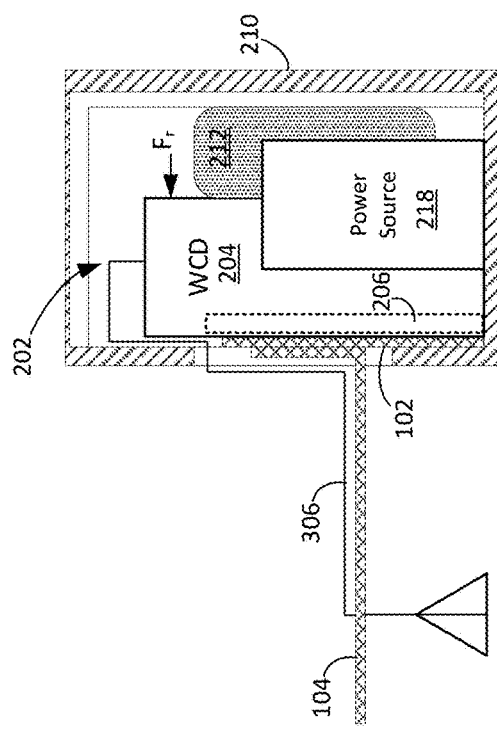
FIG. 7 is a drawing which is useful for understanding an installation of the accessory system on a WCD in a UAV.
Figure 8:
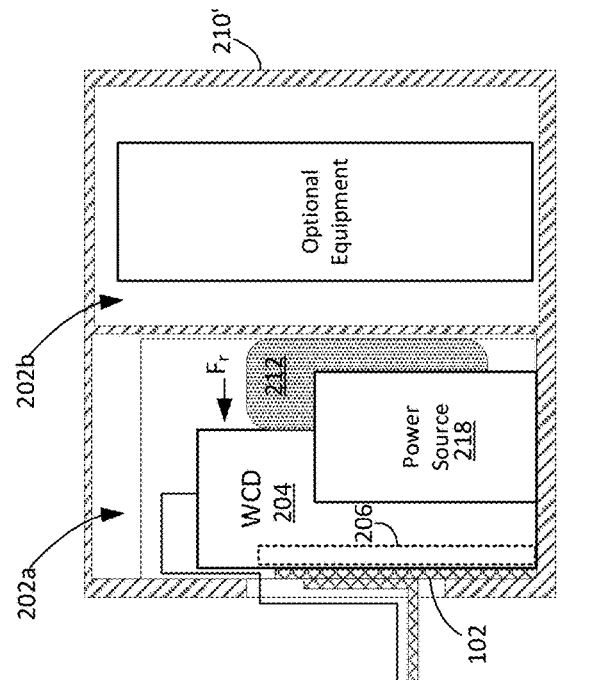
FIG. 8 is a drawing which is useful for understanding an installation of the accessory system on a WCD in an alternative UAV configuration.

The foregoing concept is best understood with reference to FIGS. 7 and 8. A resilient compressible pad 212 can be sufficient to fix the WCD in position within the payload bay 202 with a resilient force Fr. The use of the resilient compressible pad for this purpose offers a further unexpected benefit. In particular, the resilient compressible pad 212 can resiliently absorb energy from impacts (e.g., during rough landing) which may be encountered by the portions of the accessory system 100 which are exposed outside the fuselage. Such impact forces are coupled to the WCD but are then damped and absorbed by the resilient pad. This added capability allows the resilient compressible pad to firstly perform a retention function for the WCD 204 and accessory system 100, and secondly helps protect the exposed portions of the accessory system from potential damage. In some scenarios, the resilient compressible pad 212 can also help fix in place a power source or battery 218 which is disposed in a payload bay 202 with the WCD 204. FIG. 8 shows that a similar mounting configuration can be used in an alternative UAV in which a payload bay is split into more than one compartment to include payload bays 202a and 202b, where payload bay 202b contains optional equipment.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. An unmanned aerial vehicle (UAV), comprising:
   a wireless communication device (WCD) disposed interior of a fuselage of the UAV; and
   a multi-purpose WCD accessory comprising:
      a first plate comprised of opposing first and second major faces;
      the first major face comprising a heat transfer surface configured to contact a body of the WCD interior of the UAV when the WCD is secured to the first major face;
      a second plate attached to the second major face in a cantilever configuration and including a portion which extends exterior of the fuselage in a direction away from the second major surface, the second plate including a first broad face on a first major side and a second broad face on a second major side opposed from the first major side;
   wherein the second plate comprises a ground plane portion for an antenna system of the WCD accessory utilized by the WCD, and together with the first plate the second plate forms a heat sink for the WCD.

2. The UAV of claim 1, wherein the ground plane portion includes a plurality of conductive radial rod elements extending from peripheral portions of the second plate.

3. The UAV of claim 2, wherein the conductive radial rod elements are directly thermally coupled to the second plate whereby the heat sink is further comprised of the conductive radial rod elements.

4. The UAV of claim 1, wherein the first and second plates are comprised of a material that is highly conductive of thermal energy to transfer heat away from the WCD when the WCD is mounted to the first plate.

5. The UAV of claim 1, wherein the second plate is oriented on the fuselage to facilitate a cooling air flow in directions aligned parallel to the first and second broad faces when the UAV is in motion.

6. The UAV of claim 1, further comprising an antenna radiating element mounted to the second plate configured to facilitate wireless communications by the WCD.

7. A method for cooling a wireless communication device (WCD) disposed in an unmanned aerial vehicle (UAV), comprising:
   thermally coupling a conductive metal plate to a heat sink surface of the WCD;
   arranging the conductive metal plate so that it extends directly from an interior of a fuselage of the UAV where it is thermally coupled to the WCD, to an exterior of the fuselage where it can be exposed to a flow of air resulting from movement of the UAV; and
   using the conductive metal plate together with another conductive metal plate to form a heat sink for the WCD.

8. The method of claim 7, further comprising using an antenna radiating element to facilitate wireless communications with the WCD.

9. The method of claim 7, further comprising using a plurality of conductive radial rod elements thermally coupled to the conductive metal plate to enhance both a performance of the ground plane and the cooling of the WCD.

10. The method of claim 7, further comprising minimizing aerodynamic drag caused by the conductive metal plate by orienting the conductive metal plate so that the flow of air is parallel to at least one major surface of the plate.

11. The method of claim 7, further comprising using a resilient compressible pad to perform a dual function of fixing a position of the WCD within the fuselage and absorbing impact energy applied to the conductive metal plate due to interactions of the metal plate with objects in the environment external of the UAV.

* * * * *